No. 728,132. PATENTED MAY 12, 1903.
M. REID.
BALL BEARING.
APPLICATION FILED JULY 9, 1902.
NO MODEL.
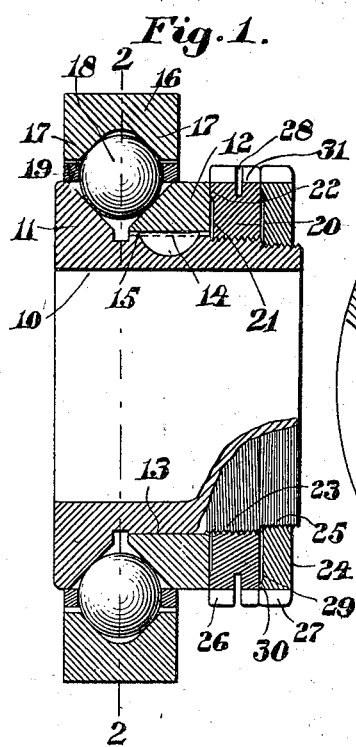
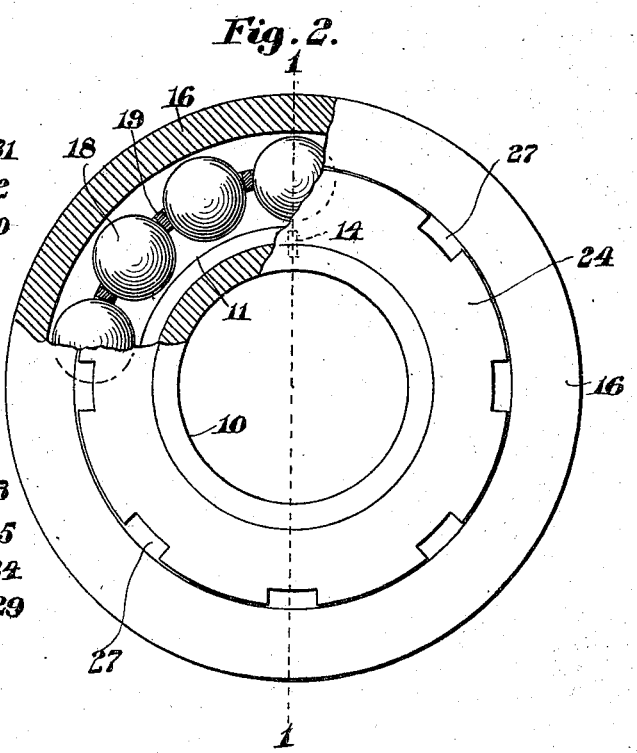
Witnesses:
Walter E. Lombard.
George Pezzetti
Inventor:
Marcellus Reid
by Wright, Brown & Quinby
Attys.

No. 728,132. Patented May 12, 1903.

UNITED STATES PATENT OFFICE.

MARCELLUS REID, OF PROVIDENCE, RHODE ISLAND.

BALL-BEARING.

SPECIFICATION forming part of Letters Patent No. 728,132, dated May 12, 1903.

Application filed July 9, 1902. Serial No. 114,892. (No model.)

*To all whom it may concern:*

Be it known that I, MARCELLUS REID, of Providence, in the county of Providence and State of Rhode Island, have invented certain new and useful Improvements in Ball-Bearings, of which the following is a specification.

This invention relates to ball-bearings for shafts, &c.

Among the objects sought to be accomplished are greater accuracy of the bearing-surfaces in all adjustments and a consequent increase in the durability and smooth-running qualities of the bearing. These objects I accomplish by the novel construction hereinafter set forth.

Of the accompanying drawings, Figure 1 represents a sectional view showing a bearing unit constructed in accordance with my invention. Fig. 2 represents an end elevation thereof.

The same reference characters indicate the same parts in both figures.

Referring to the drawings, 10 represents a hardened sleeve adapted to be fitted to a shaft and having a bearing-ring 11 integrally formed thereon with its sloping face ground true.

12 is an axially-slidable adjusting-ring ground to slide with a true fit upon a cylindrical seat or bearing-surface 13, formed on the sleeve 10, said ring being held from rotation by means of a spline or key 14 sunk in the sleeve 10 and fitting a groove 15, formed in the ring 12.

16 is an outer bearing member or collar formed with rings 17 17, including between them a ballway or groove similar to the ballway or groove included between rings 11 12.

18 represents antifriction-balls interposed between the inner and outer bearing members, and 19 is a ball separator or cage.

The adjusting-ring 12 seats itself against a nut 20, whose face is recessed at 21, leaving an outer annular bearing-surface 22, which is ground to a true fit with the back of the adjusting-ring 12. The nut 20 screws upon a thread 23, formed upon the sleeve 10, and is locked by a nut 24 screwing upon a thread 25, formed on a portion of the sleeve 10 of less diameter than the portion bearing the thread 23. The threads 23 and 25 are of opposite pitch, the one being right hand and the other left hand, or vice versa. The inner nut 20 is provided with a circumferential cut or groove 28, formed near enough to the outer face of said nut to render the intervening metal somewhat springy. The outer nut 24 is recessed at 29 to leave an outer annular shoulder or bearing-surface 30 to bear against the said springy portion of the ring 20. The two rings are formed with uniformly-spaced notches 26 27 around their circumference to receive a spanner for turning the nuts.

In the bearing constructed as described I have particularly aimed to avoid rotating adjustments. It will be seen that the adjustable bearing member 12 does not rotate with respect to its supporting-sleeve 10, but slides in an axial direction. Owing to the practical impossibility of obtaining a true hardened thread, a hardened bearing member adjusting by a thread formed on itself is found to be untrue in its different rotative positions. This is an inherent defect in such bearings, but is avoided by my improved construction. The oppositely-threaded nuts 20 24 can be securely held in any fixed position by screwing them tightly together. Their frictional locking action when thus related is greatly aided by the spring-flange 31, formed between the groove 28 and the back face of the nut 20 and abutted by the bearing-shoulder 30. The nut 24 being made sufficiently thin, the reaction between flange 31 and shoulder 30 tends to slightly dish or concave said nut, so that the outer convolutions of its thread will increase their frictional hold on the complemental thread 25.

The above-described bearing unit can be manufactured in standard sizes and fitted to various situations. The sleeve constitutes the base or body portion of the bearing unit, all the other parts of the said unit being assembled on the sleeve, so that the bearing unit can be quickly and conveniently applied and removed as a whole.

I claim—

1. A ball-bearing comprising a sleeve having at one end a fixed bearing-ring, the said sleeve being formed with screw-threads of opposite pitch at the other end, and with a smooth cylindrical portion between the said bearing-ring and the inner thread, an adjustable bearing-ring mounted to slide axially on said cylindrical portion toward and from the fixed bearing-ring, means to prevent said adjustable ring from rotating, oppositely-threaded coacting nuts mounted on the respective screw-threads for opposing outward axial movement of the adjustable ring, a series of antifriction-balls mounted in the groove between said bearing-rings, and an outside bearing-annulus formed with portions flanking the balls on opposite sides so as to oppose axial displacement of said annulus in either direction, the whole structure forming a self-contained bearing unit, all the other parts being assembled on the sleeve.

2. A ball-bearing comprising relatively rotatable bearing members, one of which includes a support formed with screw-threads of opposite pitch, a bearing-ring axially adjustable on said support, oppositely-threaded nuts engaged with the respective screw-threads for opposing outward axial movement of said bearing-ring, one of said nuts having a radial spring-flange, adapted to exert pressure against the inner side of the other nut, the latter having an area coacting with said flange, a concentric area adjacent to the support and not coacting with said flange, and a resilient body adapted to be slightly dished or concaved by the pressure, and antifriction-balls interposed between said bearing members.

In testimony whereof I have affixed my signature in presence of two witnesses.

MARCELLUS REID.

Witnesses:
B. B. FOLLETT,
J. SHARPLES.